(12) United States Patent
Ahmad et al.

(10) Patent No.: US 9,495,239 B1
(45) Date of Patent: Nov. 15, 2016

(54) USER-CONFIGURABLE ERROR HANDLING (71) Applicant: Xilinx, Inc., San Jose, CA (US)

(72) Inventors: Sagheer Ahmad, Cupertino, CA (US); Bradley L. Taylor, Santa Cruz, CA (US); Ahmad R. Ansari, San Jose, CA (US); Tomai Knopp, San Jose, CA (US)

(73) Assignee: XILINX, INC., San Jose, CA (US)

( * ) Notice: Subject to any disclaimer, the term of this patent is extended or adjusted under 35 U.S.C. 154(b) by 147 days.

(21) Appl. No.: 14/466,845

(22) Filed: Aug. 22, 2014

(51) Int. Cl.
*G06F 11/07* (2006.01)
*G06F 11/14* (2006.01)

(52) U.S. Cl.
CPC ......... *G06F 11/0793* (2013.01); *G06F 11/142* (2013.01); *G06F 11/1441* (2013.01)

(58) Field of Classification Search
None
See application file for complete search history.

(56) References Cited

U.S. PATENT DOCUMENTS

| 5,535,406 A * | 7/1996 | Kolchinsky | G06F 15/7867 712/10 |
| 6,973,608 B1 * | 12/2005 | Abramovici | G06F 11/142 714/5.1 |
| 7,477,072 B1 * | 1/2009 | Kao | H03K 19/17752 326/40 |
| 7,490,311 B1 * | 2/2009 | Payette | G06F 17/5027 716/138 |
| 2005/0257186 A1 * | 11/2005 | Zilbershlag | G06F 17/5054 716/102 |

* cited by examiner

*Primary Examiner* — Gabriel Chu
(74) *Attorney, Agent, or Firm* — LeRoy D. Maunu; Jonathan Soike; Keith Chanroo (57) ABSTRACT

A method for operating a programmable IC is disclosed. A set of circuits specified by a set of configuration data is operated in a set of programmable resources. In response to one of a set of status signals indicating an error, a value indicative of an error is stored in a respective one of a plurality of error status registers. The values stored in the plurality of error status registers are provided to an error handling circuit included in the set of circuits specified by the set of configuration data and operated in the programmable resources. At least one error handling process is performed by the error handling circuit as a function of values stored in the plurality of error status registers.

20 Claims, 4 Drawing Sheets

USER-CONFIGURABLE ERROR HANDLING

FIELD OF THE INVENTION

The disclosure generally relates to error monitoring and recovery.

BACKGROUND

Programmable integrated circuits (ICs) are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

SUMMARY

A method for operating a programmable IC is disclosed. A set of circuits specified by a set of configuration data is operated in a set of programmable resources of the programmable IC. A set of status signals is generated by a set of hardwired detection circuits coupled to the programmable resources. Each status signal indicates a status of a respective operating parameter of the programmable IC. In response to one of the status signals indicating an error, a value indicative of an error is stored in a respective one of a plurality of error status registers. The values stored in the plurality of error status registers are provided to an error handling circuit included in the set of circuits specified by the set of configuration data and operated in the programmable resources. At least one error handling process is performed by the error handling circuit as a function of values stored in the plurality of error status registers.

A system is also disclosed. The system includes a plurality of sub-systems, including at least a programmable logic sub-system configured to implement a set of circuits specified in a set of configuration data. The system also includes a set of registers configured to receive and store error signals generated during operation of the system. An error handling circuit of the system is configured to receive the errors stored in the set of registers. The error handling circuit resets individual ones of the plurality of sub-systems as a function of the errors stored in the set of registers and a set of user defined criteria specified in the set of configuration data.

A second method of operating a programmable IC is also disclosed. Programmable resources of the programmable IC are programmed to implement a set of circuits specified by a set of configuration data. Firmware of a hardwired power management unit in the programmable IC is programmed to cause the power management unit to perform an action specified in the set of configuration data in response to a set of status signals indicating a combination of errors specified in the set of configuration data. A set of hardwired detection circuits coupled to the programmable resources generates the set of status signals. Each status signal indicates a status of a respective operating parameter of the programmable IC. In response to one of the status signals indicating an error, a value indicative of an error is stored in a respective one of a plurality of error status registers corresponding to the one of the status signals. The values stored in the plurality of error status registers are provided to the power management unit. The power management unit performs the action specified in the set of configuration data in response to the values stored in the plurality of error status registers indicating the combination of errors specified in the set of configuration data.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which.

DETAILED DESCRIPTION OF THE DRAWINGS

Error handling is performed in a number of applications to mitigate adverse effects of errors that occur in a system. Errors may include, for example, power failure, clock errors, lockstep error, temperature error, timeout, etc. In some approaches, error handling is performed by dedicated hardware state-machines. However, error handling requirements can vary greatly for different systems and applications. Fixed hardware error handling may not provide suitable error handling in systems, such as programmable ICs, which may be used in a wide variety of applications.

Circuits and methods are disclosed for user-configurable handling of errors. In some implementations, a method for user-configurable error handling in a programmable IC is provided. Status signals are generated using a set of hard-wired detection circuits coupled to various sub-systems of the programmable IC. Each of the status signals indicates a status of a respective operating parameter of the programmable IC. The operating parameters may include, for example, power domain voltages, operating temperatures, circuit responsiveness, built-in-self test results, etc.

In response to one of the status signals indicating an error, a value indicative of an error is stored in a corresponding one of a set of error status registers. In some implementations, the error status registers are configured to maintain the values indicative of errors until an error reset signal is received (e.g., from an error handling circuit). The values stored in the error status registers are provided to an error handling circuit that is specified by a set of configuration data and implemented by programmable resources of the programmable IC. The error handling circuit performs one or more error handling processes as a function of values stored in the plurality of error status registers. As the error handling circuit is implemented by programmable resources according to the configuration data, the error handling circuit can be configured to implement a user-defined error handling policy.

The values of the error status registers may be masked with a mask included in the configuration data to produce a set of masked error signals. The mask included in the configuration data may be selected by a user to isolate error signals of interest. The masked error signals may be output from the programmable IC as alerts or may be used to trigger various actions to mitigate the errors. For instance, the error handling circuit may be configured to power down or reset the entire programmable IC, or reset individual systems in which localized errors have been detected.

In some implementations, a programmable IC includes a plurality of sub-systems powered by respective power domains. The plurality of sub-systems includes at least a programmable logic sub-system configured to implement a set of circuits specified in a set of configuration data. The system also includes a power management unit configured to reset individual sub-systems of the programmable IC in response to certain events without interrupting operation of the other sub-systems. In some implementations, the power management unit may reset an individual sub-system in response to detected errors or system status satisfying a set of user defined criteria.

In some implementations, a power management unit, configured for independent reset of subsystems, may be used in combination with the above described error status registers. For example, in some implementations, the values of the error status registers are provided as interrupts to a power management unit. The power management unit may be configured to reset one or more sub-systems of the programmable IC in response to a specific combination of the interrupts. For instance, the power management unit may reset a first sub-system in response to a first combination of errors indicated by the interrupts and reset a second sub-system in response to a second combination of errors indicated by the interrupts. In some implementations, firmware of the power management unit may be user-configurable to allow a user to define actions to take for one of more combinations of the interrupts.

At startup of a programmable IC, a set of configuration data may be used to program programmable resources of the programmable IC and to program firmware of the power management circuit. The programmable resources may be programmed to implement a set of circuits specified in the set of configuration data. The firmware may be programmed to cause the power management unit to perform an action specified in the set of configuration data in response to values of the error status registers indicating a combination of errors specified in the set of configuration data.

The power management unit may be programmed, via the firmware, to reset various sub-systems of the programmable IC individually, without resetting other ones of the systems. Such capability may be required in certain applications. For instance, in a no-fail application, redundant processes may be performed by different sub-systems of a programmable IC (e.g., a processing sub-system and a programmable logic sub-system). Such an application may require that at least one of the redundant processes remain in operation at any given time.

In some implementations, the power management unit and/or the error handling circuit is configured to reset a first one of the sub-systems in response to a first combination of the error signals indicating errors. The power management unit and/or the error process circuit may be further configured to reset a second one of the sub-systems in response to a second combination of the error signals indicating errors.

Due to possible interoperation between various sub-systems, it can be difficult to reset an individual sub-system without adversely affecting other sub-systems. In some implementations, a system is isolated from other sub-systems prior to resetting the sub-system. Isolation of a sub-system may be performed by preventing new data transactions from being sent to the sub-systems and allowing pending data transactions of the sub-systems to complete.

In some implementations, the programmable IC includes a processing sub-system that programs a programmable logic sub-system with the configuration data when the processing sub-system is powered up. Normally, reset of the processing sub-system would cause the programmable logic sub-system to be reprogrammed and/or reset. In some implementations, the programmable IC may be configured to inhibit reset/reprogramming of the programmable logic sub-system prior to resetting the processing sub-system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same items; however, in alternative examples the items may be different.

Figure 1:
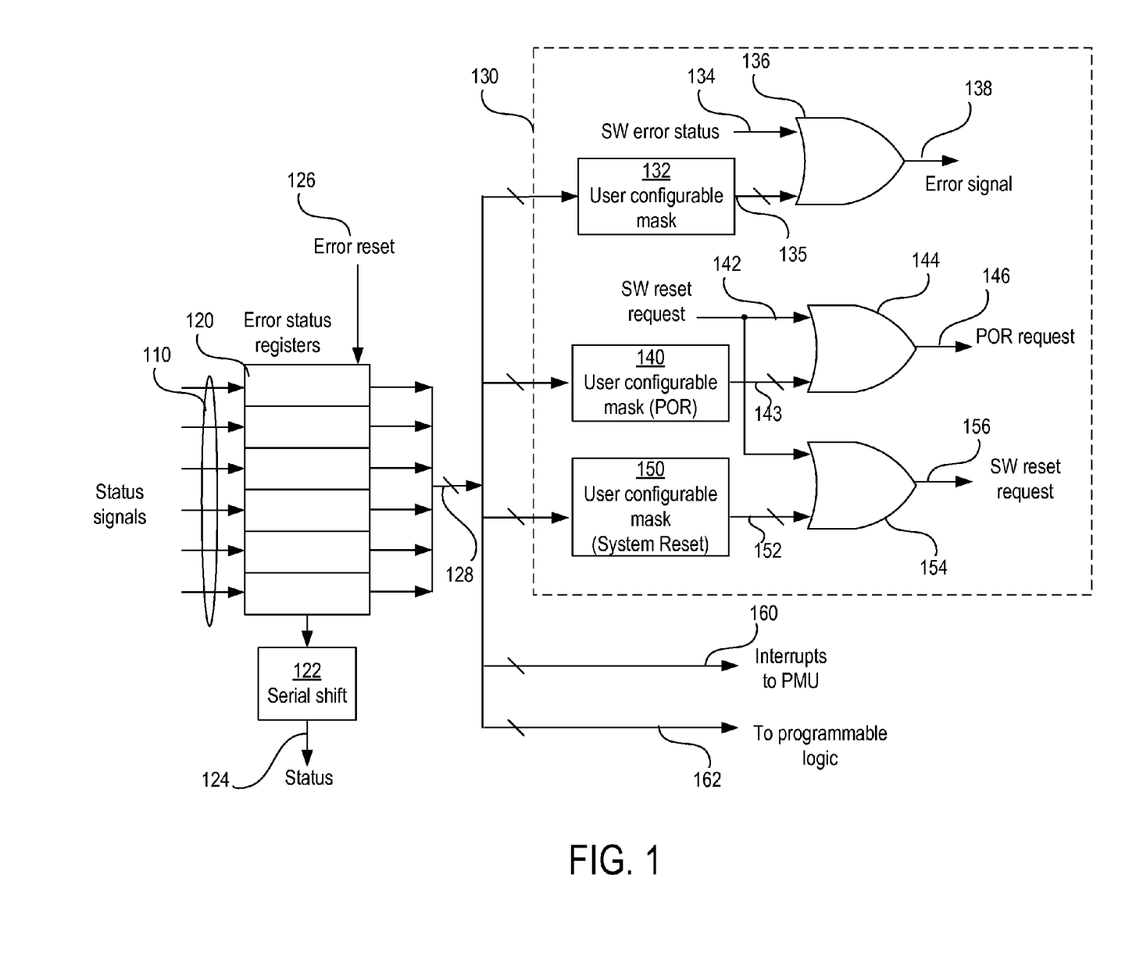
FIG. 1 shows a system for error handling, in accordance with one or more implementations.

Turning now to the figures, FIG. 1 shows a system for error handling, in accordance with one or more implementations. The system includes a set of error status registers 120, each configured to receive a respective status signal of a set of status signals 110. The error status registers 120 are configured to store and maintain data values indicating whether or not the status signals 110 have indicated the presence of errors in the system. The error status registers 120 store the data values indicative of errors until the cleared by an error reset signal 126. For instance, in some implementations, the status signals may each indicate a logical 0 value if no error is present and indicate a logical 1 if an error is present. When reset by the error reset signal 126, the values of all of the error status registers may be set to logical 0, indicating no error is present. In response to one of the status signals 110 indicating an error, the value of a corresponding one of the error status registers 120 is set to a logical 1. The logical 1 value is maintained by the register even if the status signal later returns to a logical 0 value. By maintaining the values indicative of error in the error status registers 120, the errors may be more easily processed by error handling circuitry, for example. For instance, as the values indicating errors are maintained in the error status registers 120, error handling circuitry may retrieve/receive values of the registers 120 less frequently without missing occurrences of intermittent errors.

The values of the error status registers 120 are output in parallel for error handling and/or monitoring by various circuits that may be included in the system. For ease of illustration the parallel signals output from the error status registers 120 are shown grouped together as a multi-bit signal 128. For example, the values of the error status registers 120 are provided as parallel error signals 162 to a programmable logic sub-system for processing by user-defined circuits implemented therein. A user may program the programmable logic, via a set of configuration data, to implement a customized error handling circuit. The error handling circuit may be configured by a user to perform a number of different actions in response to various combinations of errors indicated by the error status registers 120. For instance, error handling circuitry defined by a user may trigger one or more system-wide actions such as reset, shutdown, and/or alert. Alternatively or additionally, the error handling circuitry defined by a user may cause user-defined circuits implemented in the programmable logic to perform one or more actions. For instance, in response to an error, the error handling circuit may trigger circuits implemented in programmable logic to perform a built-in-self-test to determine if the circuits are operating correctly. Similarly, in some implementations, the parallel error signals 162 may be provided to a software-based error handling routine that is executed on a processor of the system.

Alternatively or additionally, the values of the error status registers 120 may be provided as parallel signals 160 to a power management unit. The power management unit may be configured to, for example, power-down or reset individual sub-systems or the entire system, and/or adjust voltages of various power domains. In some implementations, firmware of the power-management unit may be programmed by a user to perform user-defined actions in response to various combinations of errors indicated by the error status registers.

In some implementations, the system may optionally include various masking circuits 130 to filter the errors indicated by the error status registers 120. For instance, the circuits may filter errors indicated by the error status registers 120 with a user-defined mask to produce a set of masked signals of interest. The user-defined mask may be specified, for example, within a set of configuration data used for configuration of a programmable logic sub-system. The user-defined mask may isolate a set of errors that may be used individually or together to trigger certain actions. For example, the masked error signals may be used to set control signals used by one or more hardwired circuits in a programmable IC, such as a reset circuit. For instance, a logical OR gate may be used to trigger an action if any of the masked signals indicates an error. A logical AND gate may be used to trigger an action only if all of the masked-signals indicate an error. Combinations of various logic gates may be used to create more complex triggers.

As shown in FIG. 1, the masking circuits 130 may include a first user-configurable mask 132 that produces a first set of masked error signals 135. Logical OR gate 136 sets an error signal 138 to a value indicative of an error if any of the masked error signals 135 indicates an error or if SW error status signal 134 indicates an error. As another example, the masking circuits 130 may include a second user-configurable mask 140 that identifies a set of error signals 143 that are to trigger power-on reset of the system. A logical OR gate 144 may trigger power-on-reset (POR) of the system by setting POR request signal 146 to a logical 1 if any of the masked signals 143 indicate an error or if the SW reset request 142 is set to a logical 1. As yet another example, the masking circuits 130 may include a user-configurable mask 150 that identifies a set of error signals 152 that are to trigger a software reset in the system. A logical OR gate 154 triggers software reset by setting a SW reset request signal 156 to a logical 1 if any of the masked signals 152 indicate an error or if the SW reset request 142 is set to a logical 1.

In some implementations, the error status registers may include a shift circuit 122 configured to serially shift out the values of all of the registers to produce a serial status signal 124 that indicates the values of each of the error status registers 120. The serial status signal 124 may be output from the system, or may be provided to various circuits for error handling. For instance, in some implementations, the serial status signal 124 may be provided to an error handling circuit in programmable logic in lieu of parallel signals 162.

Figure 2:
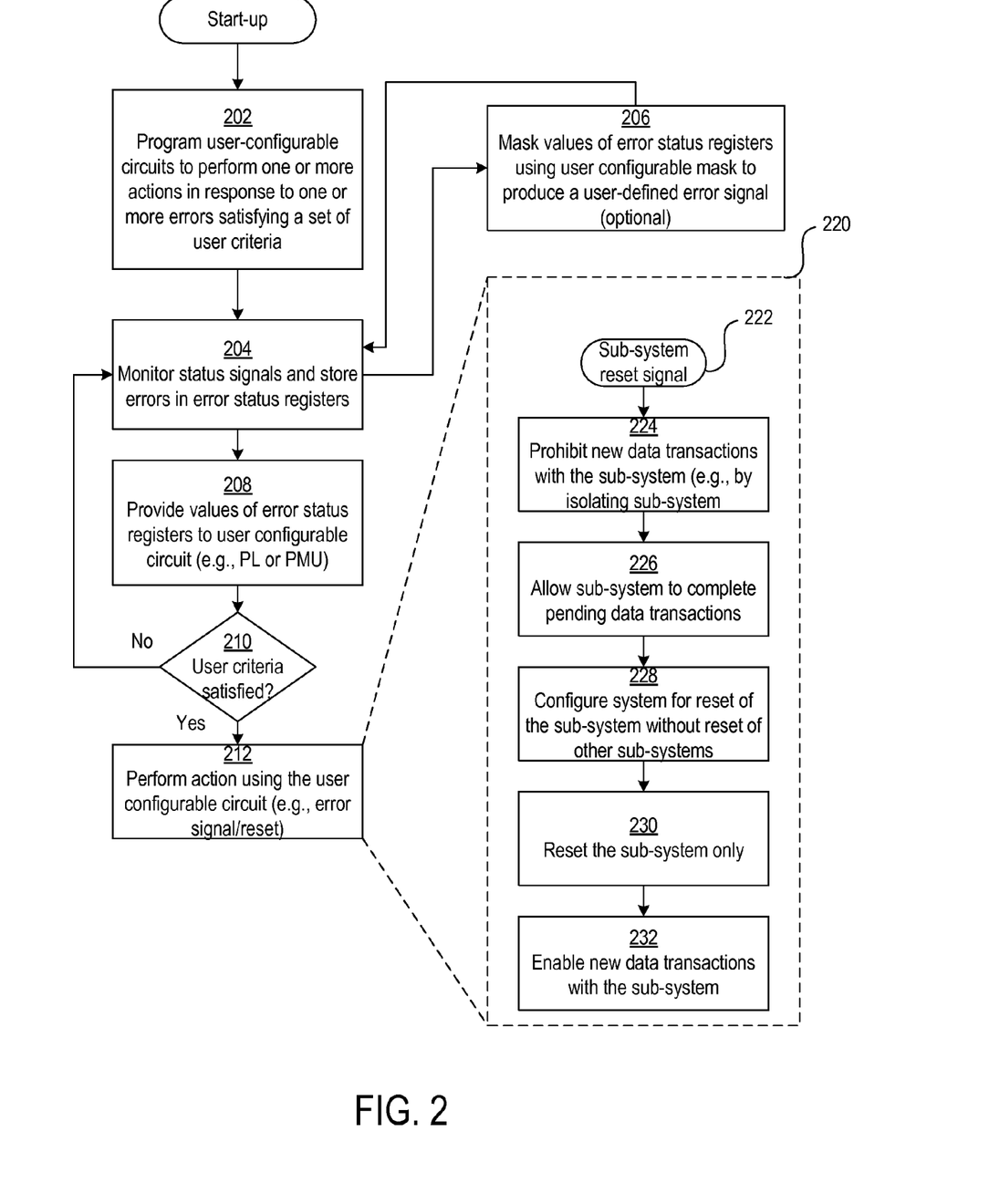
FIG. 2 shows a process for error handling, in accordance with one or more implementations.

FIG. 2 shows a process for error handling, in accordance with one or more implementations. At block 202, user-configurable circuits are programmed to perform one or more actions in response to one or more errors, alone or in combination, satisfying a set of user criteria. The programming may include, for example, programming programmable resources to implement an error handling circuit specified in a set of configuration data. Alternatively or additionally, the programming may configure a hardwired circuit to perform the one or more actions. For instance, firmware of a power management unit may be configured to cause the power management unit to reset one or more sub-systems in response to the user criteria being satisfied by a combination of error signals.

At block 204, status signals are monitored and detected errors are stored in error status registers. At optional block 206, the process masks errors indicated by the error status using a user-configurable mask to produce a status signal. At block 208, values of the error status registers are provided to a user-configurable circuit. For example, the values of the error status registers may be provided to an error handling circuit specified in a set of configuration data and implemented in programmable logic.

If user criteria is not satisfied by the values of the error status registers at decision block 210, the process continues to monitor signals and store detected errors at block 204, and provide values of the error status registers to the user-configurable circuit at block 208. If the user criteria is satisfied at decision block 210, the one or more actions are performed at block 212 using the user-configurable circuit.

The user-configurable circuit may be programmed at block 202 to perform a number of different actions in response to detected errors, such as voltage adjustment, power-down, reset, error signal generation, data backup, switch to redundant/backup system, built-in-self-test, etc. In some implementations, the user-configurable circuit may be configured to reset a sub-system in which a localized error has occurred without resetting other sub-systems which are operating correctly.

Block 220 shows an example process for reset of an individual sub-system that may be triggered by the user-configurable circuit at block 212. In response to a sub-system reset signal 222, new data transactions with the sub-system are prohibited at block 224. At block 226, the sub-system is allowed to complete pending data transactions. At block 228, the system is configured for reset of the sub-system without reset of the other sub-systems. For instance, a first sub-system may be configured to program a second sub-system when the first sub-system is initially powered on. The system may be configured at block 228 to temporarily prevent the second sub-system from being programmed while the first sub-system is being reset. The sub-system is reset at block 230. After reset is performed, net data transactions with the sub-system are enabled at block 232. Processes for resetting individual sub-systems is described in more detail with reference to FIG. 3.

Figure 3:
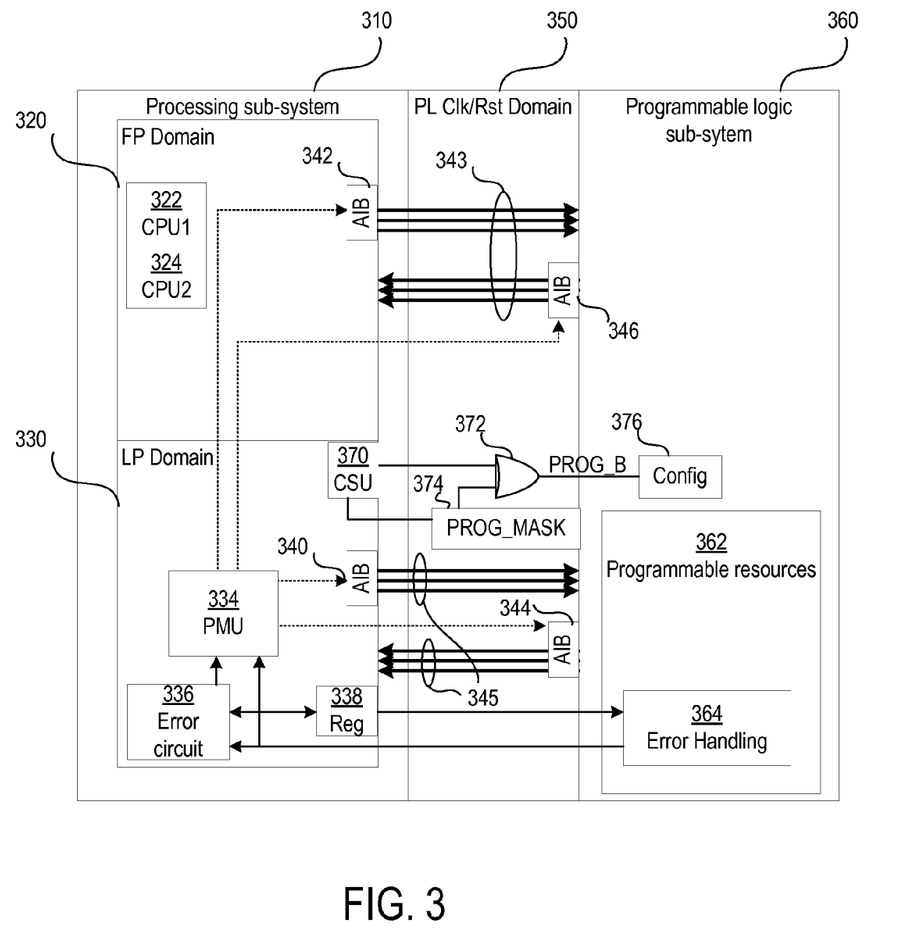
FIG. 3 shows a system with error handling circuits configured for independent reset of individual sub-systems.

FIG. 3 shows a system with error handling circuits configured for independent reset of individual sub-systems. The system includes a processing sub-system 310 and a programmable logic sub-system 360. The programmable logic sub-system 360 includes a set of programmable resources 362 that may be configured to implement an error handling circuit 364 specified in a set of configuration data. The processing sub-system 310 includes a set of processors 322 and 324 that may be configured to execute one or more user-defined programs.

The processing sub-system 310 and the programmable logic sub-system 360 are operated in respective power domains and may be powered-down and/or reset separately by a power management unit (PMU) 334. In this example, the set of processors 322 and 324 of the processing sub-system 310 are operated in a first power domain 320, referred to as the "full-power" domain. The processing sub-system 310 also includes a set of circuits that are operated in a second power domain 330, referred to as the "low-power" domain. The low-power domain 330 includes circuits, such as error detection circuits, that are to remain in operation when the full-power domain is reset or powered down. Similarly, power domain 350 is provided for operating clocking and/or reset circuitry needed to remain in operation when the programmable logic sub-system 360 is reset or powered down.

The low-power domain 330 includes an error circuit 336 configured to detect errors by monitoring status signals and store detected errors in a set of registers 338. The system is configured to provide the errors indicated by the set of registers 338 to the programmable resources 362 for processing by the error handling circuit 364 implemented therein. The low-power domain 330 also includes the PMU 334. The PMU 334 is configured to individually reset various circuits and/or power domains in response to a reset request from the error handling circuit 364. Alternatively or additionally, the PMU 334 may be configured to individually reset various circuits and/or power domains in response to a combination of errors indicated in firmware of the PMU.

As discussed with reference to process 220 in FIG. 2, the PMU or some other reset control circuit may perform various tasks to isolate a sub-system prior to reset. For instance, the PMU 334 may use AXI isolation blocks (AIBs) 340, 342, 344, and 346 to disable data paths 343 and/or 345 to and from a sub-system or power domain that is to be reset or powered down. AIBs 340, 342, 344, or 346 may be set to disable incoming data paths to the sub-system to prevent new data transactions from being initiated in the system. The PMU 334 may set AIBs 340, 342, 344, or 346 to enable or disable various ones of the data paths 343 and 345 by adjusting values of control signals (shown as dashed lines in FIG. 3). Outgoing data paths may remain enabled to allow pending data transactions to complete. After all pending data transactions are completed by the sub-system, the AIBs 340, 342, 344, or 346 may be set to disable outgoing data paths from the sub-system to isolate the sub-system to be reset.

The PMU may trigger reset of the programmable logic sub-system 360 after it is isolated from the other sub-systems. For reset or power down of the full-power domain 320 in the processing sub-system, further action may be required to ensure the programmable resources 362 of the programmable logic sub-system are not reprogrammed until power is restored to the full-power domain 320.

The PMU may trigger reset of the processor sub-system 310 without resetting the programmable logic sub-subsystem. In this example, configuration circuit 376 prevents reset/programming of programmable resources 362. The configuration circuit 376 must be reset by configuration and security unit (CSU) 370 before programmable resources 362 may be programmed. The CSU 370 resets the configuration circuit 376 by asserting PROG_B signal to logic 0 value. To avoid resetting programmable logic 360, configuration 376 should not be reset. Prior to resetting processor sub-system 310, the PMU 334 sets PROG_MASK signal 374 to logic 1 value. If PROG_MASK is set to logic 1, then the PROG_B signal output from OR gate 372 will remain logic 1 and configuration circuit 360 will not be reset. Other mechanisms may alternatively be used to prevent programming of the programmable logic sub-system 360.

Figure 4:
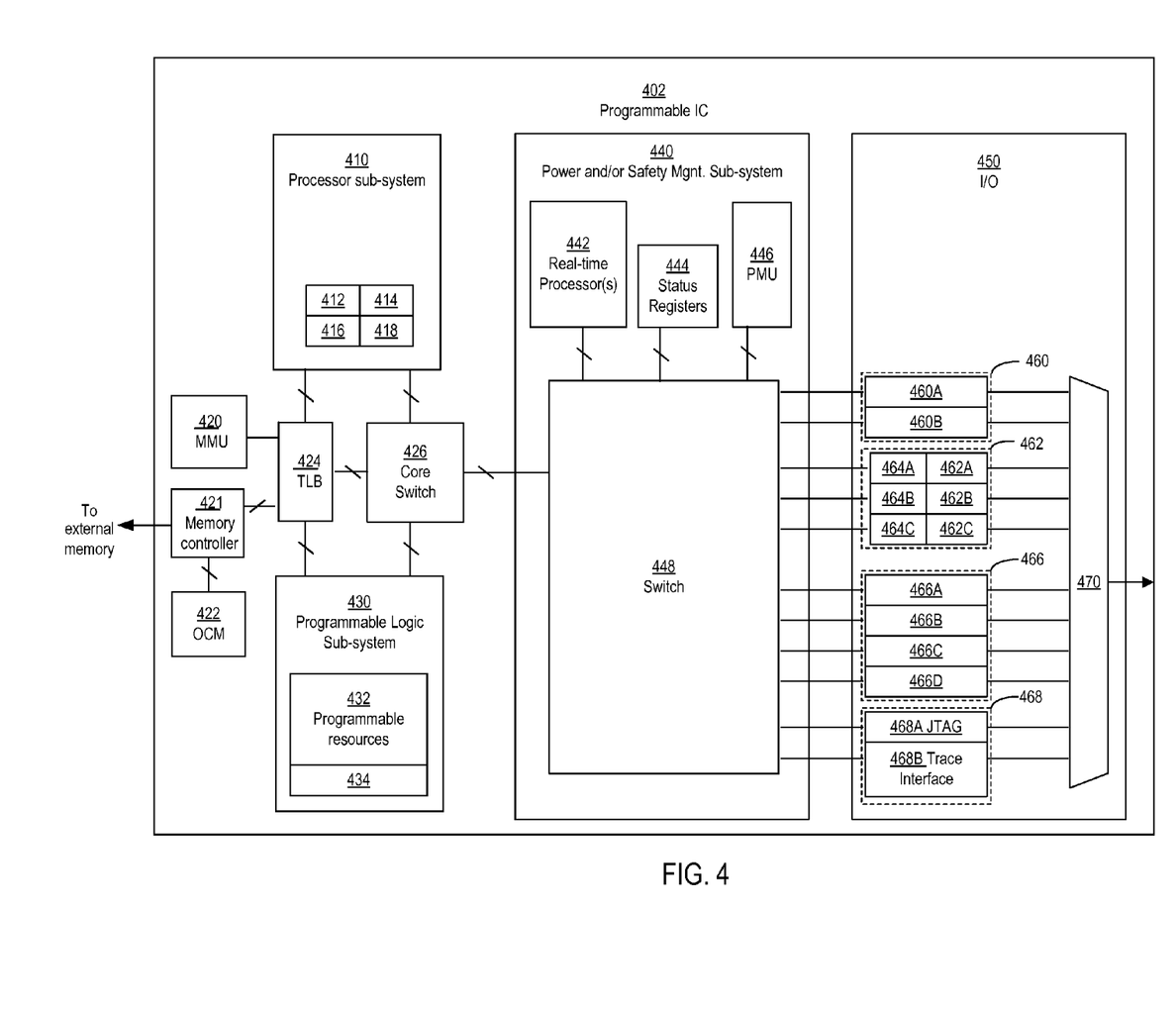
FIG. 4 shows a programmable IC consistent with one or more implementations.

FIG. 4 shows a programmable IC 402 that may be configured in accordance with one or more implementations. The programmable IC may also be referred to as a System On Chip (SOC), which includes a processing sub-system 410 and a programmable logic sub-system 430. The processing sub-system 410 may be programmed to implement a software portion of the user design, via execution of a user program. The program may be specified as part of a configuration data stream or may be retrieved from an on-chip or off-chip data storage device. The processing sub-system 410 may include various circuits 412, 414, 416, and 418 for executing one or more software programs. The circuits 412, 414, 416, and 418 may include, for example, one or more processor cores, floating point units (FPUs), an interrupt processing unit, on chip-memory, memory caches, and/or cache coherent interconnect.

The programmable logic sub-system 430 of the programmable IC 402 may be programmed to implement a hardware portion of a user design. For instance, the programmable logic sub-system may include a number of programmable resources 432, which may be programmed to implement a set of circuits specified in a configuration data stream. The programmable resources 432 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 432 may be programmed by loading a configuration data stream into the configuration memory cells, which define how the programmable interconnect circuits and programmable logic circuits are configured. The collective states of the individual memory cells then determine the function of the programmable resources 432. The configuration data can be read from memory (e.g., from an external PROM) or written into the programmable IC 402 by an external device. In some implementations, configuration data may be loaded into configuration memory cells by a configuration controller 434 included in the programmable logic sub-system 430. In some other implementations, the configuration data may be loaded into the configuration memory cells by a start-up process executed by the processor sub-system 410.

The programmable IC 402 may include various circuits to interconnect the processing sub-system 410 with circuitry implemented within the programmable logic sub-system 430. In this example, the programmable IC 402 includes a core switch 426 that can route data signals between various data ports of the processing sub-system 410 and the programmable logic sub-system 430. The core switch 426 may also route data signals between either of the programmable logic or processing sub-systems 410 and 430 and various other circuits of the programmable IC, such as an internal data bus. Alternatively or additionally, the processing sub-system 410 may include an interface to directly connect with the programmable logic sub-system—bypassing the core switch 426. Such an interface may be implemented, for example, using the AMBA AXI Protocol Specification (AXI) as published by ARM.

In some implementations, the processing sub-system 410 and the programmable logic sub-system 430 may also read or write to memory locations of an on-chip memory 422 or off-chip memory (not shown) via memory controller 421. The memory controller 421 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 421 is able to communicate is provided for purposes of illustration only and is not intended as a limitation or to be exhaustive. As shown in FIG. 4, the programmable IC 402 may include a memory management unit 420 and translation look-aside buffer 424 to translate virtual memory addresses used by the sub-systems 410 and 430 to physical memory addresses used by the memory controller 421 to access specific memory locations.

The programmable IC may include an input/output (I/O) sub-system 450 for communication of data with external circuits. The I/O sub-system 450 may include various types of I/O devices or interfaces including for example, flash memory type I/O devices, higher performance I/O devices, lower performance interfaces, debugging I/O devices, and/or RAM I/O devices.

The I/O sub-system 450 may include one or more flash memory interfaces 460 illustrated as 460A and 460B. For example, one or more of flash memory interfaces 460 can be implemented as a Quad-Serial Peripheral Interface (QSPI) configured for 4-bit communication. One or more of flash memory interfaces 460 can be implemented as a parallel 8-bit NOR/SRAM type of interface. One or more of flash memory interfaces 460 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 450 can include one or more interfaces 462 providing a higher level of performance than flash memory interfaces 460. Each of interfaces 462A-462C can be coupled to a DMA controller 464A-464C respectively. For example, one or more of interfaces 462 can be implemented as a Universal Serial Bus (USB) type of interface. One or more of interfaces 462 can be implemented as a gigabit Ethernet type of interface. One or more of interfaces 462 can be implemented as a Secure Digital (SD) type of interface.

The I/O sub-system 450 may also include one or more interfaces 466 such as interfaces 466A-466D that provide a lower level of performance than interfaces 462. For example, one or more of interfaces 466 can be implemented as a General Purpose I/O (GPIO) type of interface. One or more of interfaces 466 can be implemented as a Universal Asynchronous Receiver/Transmitter (UART) type of interface. One or more of interfaces 466 can be implemented in the form of a Serial Peripheral Interface (SPI) bus type of interface. One or more of interfaces 466 can be implemented in the form of a Controller-Area-Network (CAN) type of interface and/or an I$^2$C type of interface. One or more of interfaces 466 also can be implemented in the form of a Triple Timer Counter (TTC) and/or a Watchdog Timer (WDT) type of interface.

The I/O sub-system 450 can include one or more debug interfaces 468 such as processor JTAG (PJTAG) interface 468A and a trace interface 468B. PJTAG interface 468A can provide an external debug interface for the programmable IC 402. Trace interface 468B can provide a port to receive debug, e.g., trace, information from the processing sub-system 410 or the programmable logic sub-system 430.

As shown, each of interfaces 460, 462, 466, and 468 can be coupled to a multiplexer 470. Multiplexer 470 provides a plurality of outputs that can be directly routed or coupled to external pins of the programmable IC 402, e.g., balls of the package within which the programmable IC 402 is disposed. For example, I/O pins of programmable IC 402 can be shared among interfaces 460, 462, 466, and 468. A user can configure multiplexer 470, via a configuration data stream to select which of interfaces 460-468 are to be used and, therefore, coupled to I/O pins of programmable IC 402 via multiplexer 470. The I/O sub-system 450, may also include a fabric multiplexer I/O (FMIO) interface (not shown) to connect interfaces 462-468 to programmable logic circuits of the programmable logic sub-system. Additionally or alternatively, the programmable logic sub-system 430 can be configured to implement one or more I/O circuits within programmable logic. In some implementations, the programmable IC 402 may also include a sub-system 440 having various circuits for power and/or safety management. For example, the sub-system 440 may include a power management unit 446 configured to monitor and maintain one or more voltage domains used to power the various sub-systems of the programmable IC 402. In some implementations, the power management unit 446 may disable power of individual sub-systems, when idle, to reduce power consumption, without disabling power to sub-systems in use.

The sub-system 440 may also include safety circuits to monitor the status of the sub-systems to ensure correct operation. For instance, the sub-system 440 may include one or more real-time processors 442 configured to monitor the status of the various sub-systems (e.g., as indicated in status registers 444). The real-time processors 442 may be configured to perform a number of tasks in response to detecting errors. For example, for some errors, the real-time processors 442 may generate an alert in response to detecting an error. As another example, the real-time processors 442 may reset a sub-system to attempt to restore the sub-system to correct operation. The sub-system 440 includes a switch network 448 that may be used to interconnect various sub-systems. For example, the switch network 448 may be configured to connect the various sub-systems 410, 430, and 440 to various interfaces of the I/O sub-system 450. In some applications, the switch network 448 may also be used to isolate the real-time processors 442 from the sub-systems that are to be monitored. Such isolation may be required by certain application standards (e.g., IEC-61508 SIL3 or ISO-26262 standards) to ensure that the real-time processors 442 are not affected by errors that occur in other sub-systems.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A method of operating a programmable IC, comprising:
   operating a set of circuits, specified by a set of configuration data, in a set of programmable resources of the programmable IC;
   generating by a set of hardwired detection circuits coupled to the programmable resources, a set of status signals, each status signal indicating a status of a respective operating parameter of the programmable IC;
   in response to one of the status signals indicating an error, storing a value indicative of an error in a respective one of a plurality of error status registers corresponding to the one of the status signals;
   providing values stored in the plurality of error status registers to an error handling circuit included in the set of circuits specified by the set of configuration data and operated in the programmable resources; and
   performing by the error handling circuit, at least one error handling process as a function of values stored in the plurality of error status registers.

2. The method of claim 1, further comprising maintaining the value indicative of the error in the plurality of error status registers until a reset signal is provided to the plurality of error status registers.

3. The method of claim 1, further comprising:
   masking the values of the error status registers with a mask included in the configuration data to produce a set of masked error signals; and
   outputting an error signal as a function of the set of masked error signals.

4. The method of claim 1, further comprising:
   masking the values of the error status registers with a mask included in the configuration data to produce a set of masked error signals; and
   performing a power-on reset of the programmable IC as a function of the set of masked error signals.

5. The method of claim 1, further comprising:
   masking the values of the error status registers with a mask specified in the set of configuration data to produce a set of masked error signals; and
   performing a system reset of the programmable IC as a function of the set of masked error signals.

6. The method of claim 1, wherein each status signal in the set of status signals indicates the status of a respective one of a plurality of sub-systems in the programmable IC; and
   further comprising:
      providing the values of the error status registers as interrupts to a power management unit; and
      resetting only a first one of the plurality of sub-systems in response to a first combination of the interrupts.

7. The method of claim 6, further comprising:
   prior to resetting the first one of the plurality of sub-systems:
      prohibiting new data transactions from being sent to the first one of the plurality of sub-systems; and
      completing pending data transactions of the first one of the plurality of sub-systems.

8. The method of claim 6, wherein:
   each status signal in the set of status signals indicates the status of a respective one of the plurality of sub-systems in the programmable IC; and
   further comprising:
      resetting only a second one of the plurality of sub-systems in response to a second combination of the interrupts, the second combination of the interrupts being different from the first combination of the interrupts.

9. The method of claim 8, wherein:
   the first one of the plurality of sub-systems is a programmable logic sub-system, including the programmable resources;
   the second one of the plurality of sub-systems is a processing sub-system configured to execute a program input to the programmable IC;
   the processing sub-system is configured to, at startup of the processing sub-system, program the programmable resources of the programmable logic sub-system to implement the set of circuits; and
   the resetting of only the first one of the plurality of sub-systems includes configuring the programmable IC to prevent the processing sub-system from programming the programmable resources.

10. A system, comprising:
    a plurality of sub-systems, including at least a programmable logic sub-system configured to implement a set of circuits specified in a set of configuration data input to the system;
    a set of registers configured to receive and store error signals generated during operation of the system; and
    an error handling circuit configured to receive the errors stored in the set of registers, and reset individual ones of the plurality of sub-systems as a function of the errors stored in the set of registers and a set of user defined criteria specified in the set of configuration data.

11. The system of claim 10, wherein:
    the plurality of sub-systems includes a processing sub-system; and
    the error handling circuit is configured to:
       reset only the processing sub-system in response to a first combination of errors being stored by the set of registers; and
       reset only the programmable logic sub-system in response to a second combination of errors being stored by the set of registers.

12. The system of claim 11, wherein:
    the processing sub-system is configured to, at startup of the processing sub-system, program programmable resources of the programmable logic sub-system to implement the set of circuits specified in the set of configuration data.

13. The system of claim 11, wherein the error handling circuit is configured to reset only the programmable logic sub-system by:
  inhibiting new data transactions from being sent to the programmable logic sub-system;
  completing pending data transactions of the programmable logic sub-system;
  resetting the programmable logic sub-system; and
  in response to the programmable logic sub-system booting up, enabling new data transactions to be sent to the programmable logic sub-system.

14. The system of claim 11, wherein the error handling circuit is configured to reset only the processing sub-system by:
  inhibiting new data transactions from being sent to the processing sub-system;
  completing pending data transactions of the processing sub-system;
  inhibiting configuration of the programmable logic sub-system by the processing sub-system;
  resetting the processing sub-system; and
  in response to the processing sub-system booting up, enabling new data transactions to be sent to the processing sub-system and enabling configuration of the programmable logic sub-system by the processing sub-system.

15. The system of claim 10, wherein the set of circuits implemented by the programmable logic sub-system includes the error handling circuit.

16. The system of claim 10, further comprising an error mask circuit, configured to
  mask values of the set of registers with a mask specified in the set of configuration data to produce a set of masked error signals.

17. The system of claim 16, wherein the error mask circuit is further configured to perform a logical OR of the set of masked error signals to produce a user-defined error signal that indicates if any of the set of masked error signals indicates that an error has occurred.

18. The system of claim 16, wherein the error handling circuit is configured to perform the resetting of the individual ones of the plurality of sub-systems as a function of the masked error signals.

19. A method of operating a programmable IC, comprising:
  programming programmable resources to implement a set of circuits, specified by a set of configuration data;
  programming firmware of a hardwired power management unit (PMU) in the programmable IC to cause the PMU to perform an action specified in the set of configuration data in response to a set of status signals indicating a combination of errors specified in the set of configuration data;
  generating by a set of hardwired detection circuits coupled to the programmable resources, the set of status signals, each status signal indicating a status of a respective operating parameter of the programmable IC;
  in response to one of the status signals indicating an error, storing a value indicative of an error in a respective one of a plurality of error status registers corresponding to the one of the status signals;
  providing the values stored in the plurality of error status registers to the power management unit; and
  performing by the PMU the action specified in the set of configuration data in response to the values stored in the plurality of error status registers indicating the combination of errors specified in the set of configuration data.

20. The method of claim 19, further comprising:
  providing the values stored in the plurality of error status registers to an error handling circuit included in the set of circuits specified by the set of configuration data and operated in the programmable resources; and
  performing by the error handling circuit, at least one error handling process as a function of values stored in the plurality of error status registers.

* * * * *